US009961575B2

(12) United States Patent
Abrishamkar et al.

(10) Patent No.: US 9,961,575 B2
(45) Date of Patent: May 1, 2018

(54) PREDICTING CHANNEL STATE

(71) Applicant: QUALCOMM Incorporated, San Diego, CA (US)

(72) Inventors: Farrokh Abrishamkar, San Diego, CA (US); Chao Jin, San Diego, CA (US); Insung Kang, San Diego, CA (US); Surendra Boppana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/763,725

(22) PCT Filed: Mar. 15, 2013

(86) PCT No.: PCT/CN2013/072726
§ 371 (c)(1),
(2) Date: Jul. 27, 2015

(87) PCT Pub. No.: WO2014/139159
PCT Pub. Date: Sep. 18, 2014

(65) Prior Publication Data
US 2015/0373568 A1 Dec. 24, 2015

(51) Int. Cl.
H04W 24/08 (2009.01)
H04W 28/06 (2009.01)
H04L 5/00 (2006.01)
H04W 72/04 (2009.01)
H04W 28/18 (2009.01)

(52) U.S. Cl.
CPC .......... *H04W 24/08* (2013.01); *H04L 5/0091* (2013.01); *H04W 28/06* (2013.01); *H04W 72/0406* (2013.01); *H04W 28/18* (2013.01)

(58) Field of Classification Search
None
See application file for complete search history.

(56) References Cited

U.S. PATENT DOCUMENTS

| 8,134,933 | B2 | 3/2012 | Xiao et al. |
| 8,259,698 | B2 | 9/2012 | Park |
| 2007/0071145 | A1* | 3/2007 | Perets ............... H04L 1/20 375/346 |
| 2009/0221238 | A1 | 9/2009 | Ko et al. |

(Continued)

FOREIGN PATENT DOCUMENTS

| CN | 102104442 A | 6/2011 |
| WO | 2010062228 A1 | 6/2010 |
| WO | 2011097796 A1 | 8/2011 |

OTHER PUBLICATIONS

International Search Report and Written Opinion—PCT/CN2013/072726—ISA/EPO—Dec. 19, 2013.

Primary Examiner — Rebecca E Song
(74) Attorney, Agent, or Firm — Holland & Hart LLP

(57) ABSTRACT

A process of wireless communication for obtaining channel quality information alignment includes predicting a channel state of a future downlink subframe of a signal. The process also includes providing a base station with a set of parameters based on the predicted channel state. For example, a user equipment (UE) can obtain a recommended transport block size (RTBS) from the predictor process, and return the RTBS to the base station as one of the set of parameters.

16 Claims, 7 Drawing Sheets

(56) References Cited

U.S. PATENT DOCUMENTS

| | | | |
|---|---|---|---|
| 2010/0208606 A1* | 8/2010 | Hoshino | H04L 1/0026 370/252 |
| 2011/0280131 A1 | 11/2011 | Chin et al. | |
| 2012/0039261 A1 | 2/2012 | Chin et al. | |
| 2012/0243597 A1* | 9/2012 | Currivan | H04L 25/022 375/229 |

* cited by examiner

PREDICTING CHANNEL STATE

TECHNICAL FIELD

Aspects of the present disclosure relate generally to wireless communication systems, and more particularly, to predicting a channel state for future time periods, such as future subframes.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), which extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes predicting a channel state of a future downlink subframe of a signal. The method also includes providing a base station with a set of parameters based on the predicted channel state.

Another aspect discloses wireless communication having a memory and at least one processor coupled to the memory. The processor(s) is configured to predict a channel state of a future downlink subframe of a signal. The processor(s) is also configured to provide a base station with a set of parameters based on the predicted channel state.

Still another aspect discloses an apparatus including means for predicting a channel state of a future downlink subframe of a signal. The apparatus also includes means for providing a base station with a set of parameters based on the predicted channel state.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of predicting a channel state of a future downlink subframe of a signal. The program code also causes the processor(s) to provide a base station with a set of parameters based on the predicted channel state.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
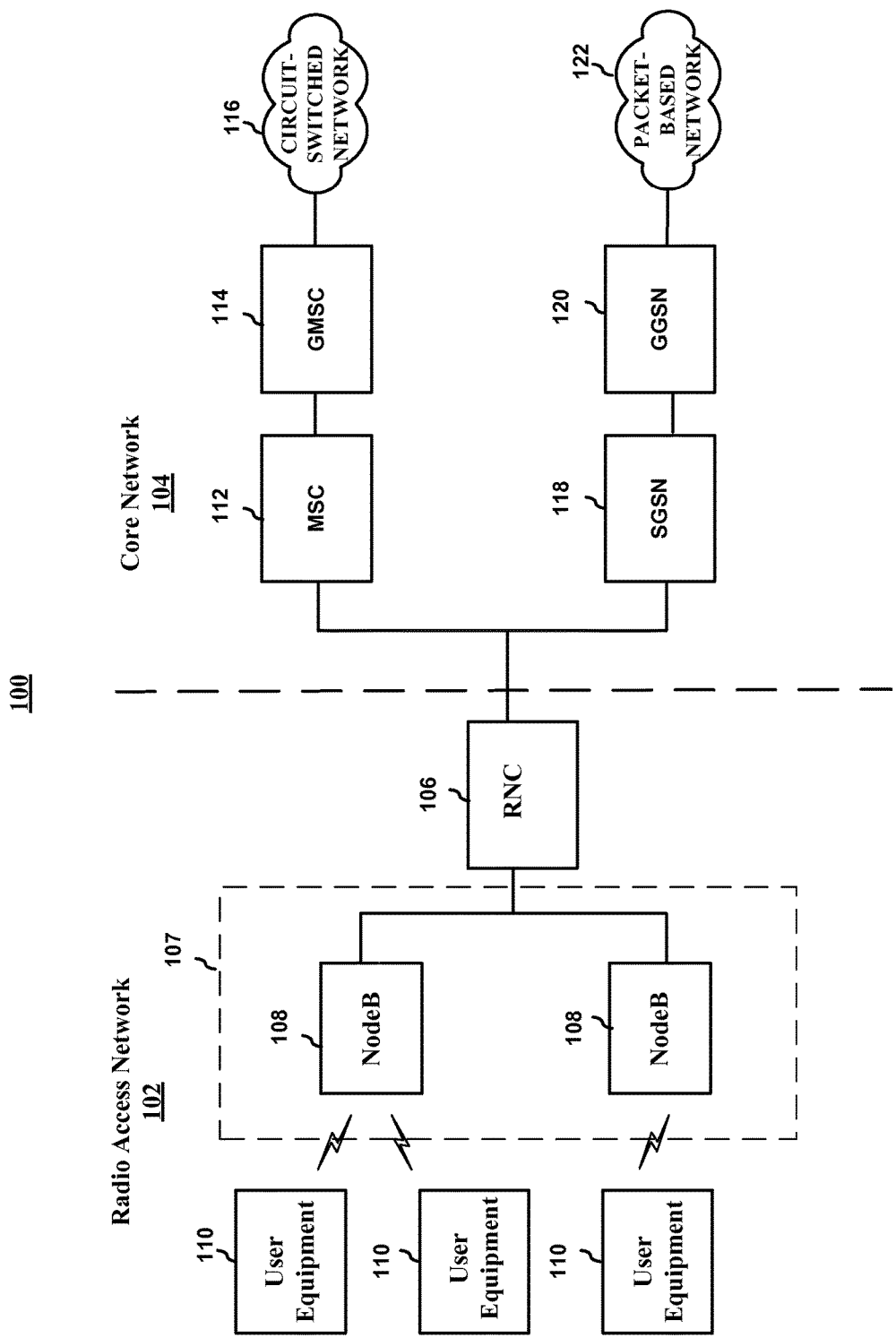
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
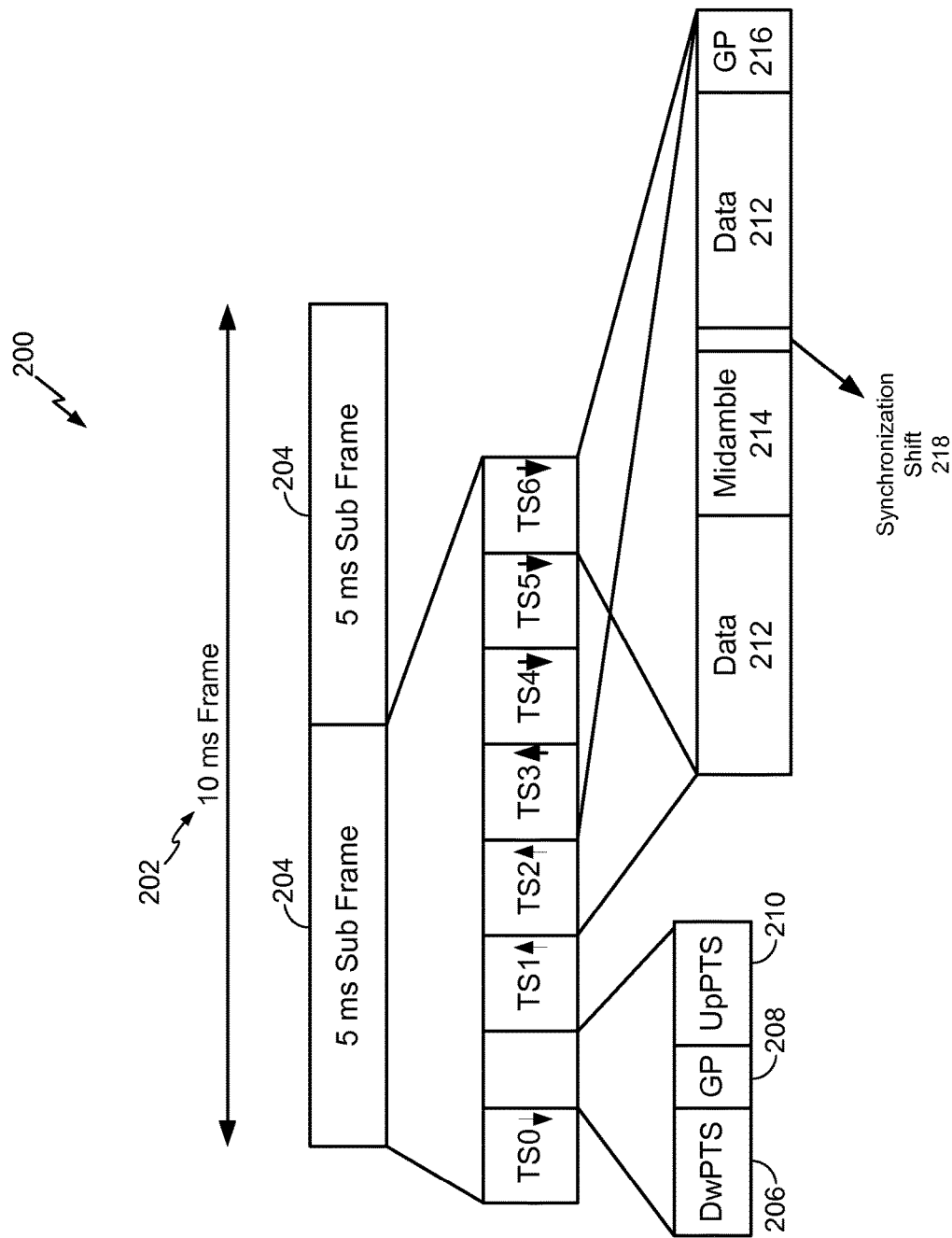
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. SS bits 218 only appear in the second part of the data portion. The SS bits 218 immediately following the midamble can indicate three cases: decrease shift, increase shift, or do nothing in the upload transmit timing. The positions of the SS bits 218 are not generally used during uplink communications.

Figure 3:
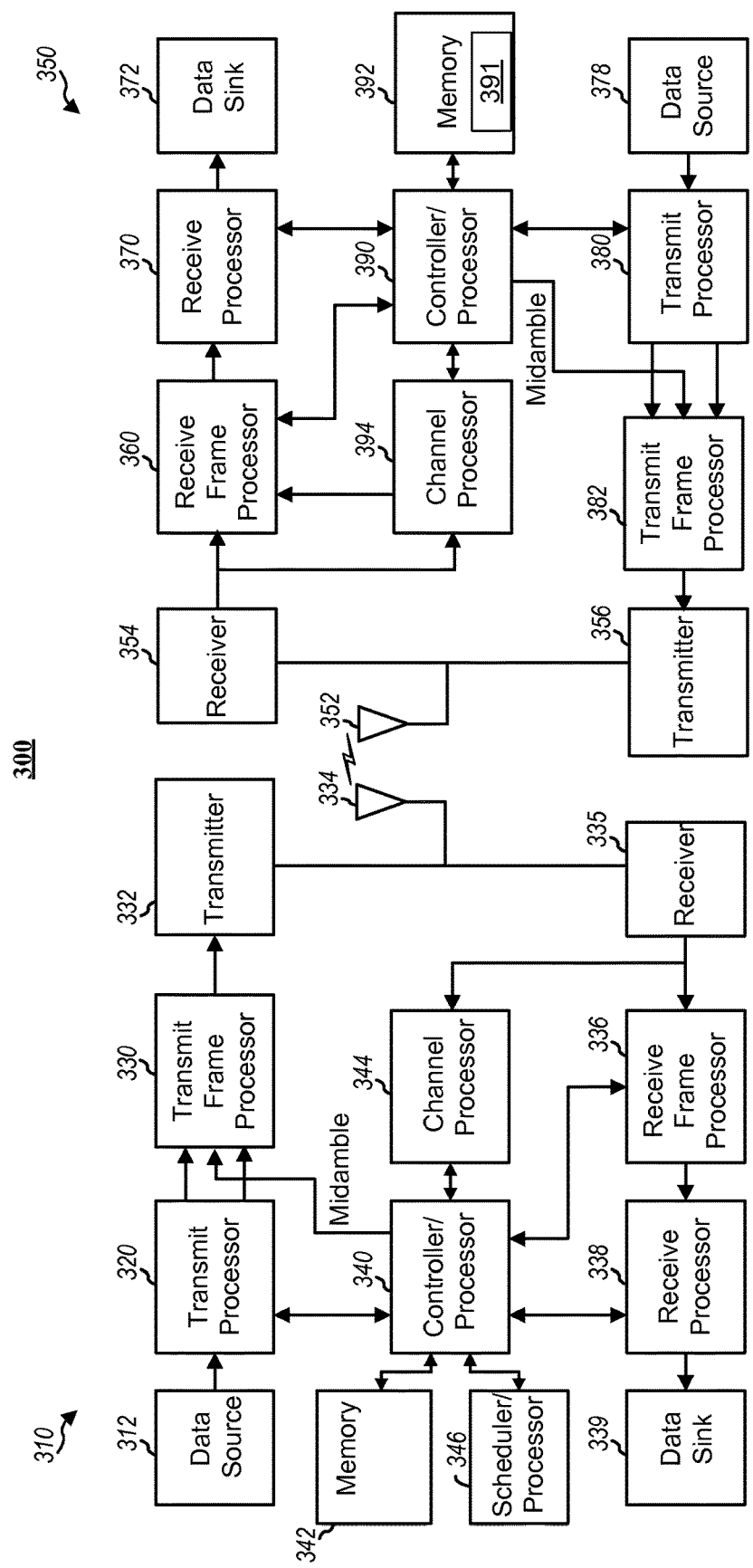
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an ACK and/or NACK protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a channel state prediction module 391 which, when executed by the controller/processor 390, configures the UE 350 for predicting a channel state of future downlink subframes. A scheduler/processor 346 at the node B 310 may be used to allocate resources to the UEs and schedule downlink and/or uplink transmissions for the UEs based on the predicted channel state.

Predicted Channel State

Provided is a system and process to predict and align channel state information, such as a channel quality index (CQI), with a time when a base station actually allocates resources. The alignment enhances traffic channel throughput for a base station in a wireless network. The prediction may be based at least in part on a gradient descent recursive prediction error method (GDRPEM).

A base station, such as the node B 310 discussed above, transmits a signal at an appropriate rate based on the CQI of a channel. This rate may be derived from one of the parameters sent from the UE to the base station, such as a recommended transport block size (RTBS).

The derivation and return to a base station of a CQI or channel state for a given channel involves a natural delay. For example, a signal received at time 1 is analyzed. The analysis takes some time. The results of the analysis (e.g., the CQI) are transmitted to the base station (for example at time 2). The transmission itself also takes time. Thus, the base station receives channel state information at time 3, for a signal sent at time 1. The base station will thus allocate current resources based on channel conditions existing in the past. It would be desirable to look ahead (e.g., two to three subframes into the future) and allocate resources based on a predicted CQI or channel state measurement. Based on this predicted CQI, a UE can derive a more accurate rate and scheduling of resources. That is, by aligning the CQI with the actual channel state at any given moment, improved conditions for the base station and the user equipment (UE) can be obtained.

According to an aspect of the present disclosure, the improved conditions for the base station and the UE result from predicting a channel state of a signal from a base station. Then, the UE is scheduled at a time coinciding with the predicted channel state for the signal. The base station selects a set of parameters (e.g., a rate, modulation and coding scheme) based on the predicted channel state.

In order to obtain a CQI value (which includes the RTBS), a signal from the base station is received. The signal has a gain, modulation, noise and power, among other properties. Spectral efficiency samples are obtained based on that signal. The spectral efficiency samples may be processed by a predictor process, and the output of that predictor process is the CQI, which is returned to the base station in order to derive the recommended rate for the base station to transmit signals.

A GDRPEM subsystem uses Wold decompositions resulting in Kalman filters, which will predict CQI. Wold decomposition is an auto regressive moving average (ARMA) model to produce a prediction error based on a predictor of the first order. The spectral efficiency samples may also be modeled by ARMA leading to the recursive predictor using a gradient decent, as described below.

A Wold decomposition provides an optimal predictor for Gaussian processes and an optimal linear predictor for co-variance stationary non-Gaussian processes. A first order approximation to the Wold decomposition results in a Kalman predictor of the first order. The parameters of the first order ARMA model are estimated using gradient descent on a prediction error based cost function. The prediction error is denoted by "e" and the cost function is merely $|e|^2$. Then, a parametric model is defined for e having the variables "a," a modeled pole, and "L," a filtered pole. The variables a and L are then solved for by using the cost function of $|e|^2$. Then, state estimation turns the parametric model for e into an equation for "s" expressed as a Δ-step GDRPEM predictor equation. Then, the Δ-step GDRPEM predictor equation is translated into an RTBS value that is to be returned to the base station. The base station may then use the RTBS value to derive the recommended rate for transmitting signals.

The performance of the GDRPEM process may be measured in normalized mean square error (MSE) dB. The approach of the present disclosure may provide an error variance of about −10 to 15 dB.

The process to align the CQI begins with a signal, which will be described as $y_t$. The signal $y_t$ has properties that include gain, modulation, noise and power. The UE then obtains spectral efficiency samples of signal $y_t$ which describe the information rate that can be transmitted over a given bandwidth. In one implementation, the gain and the power of a signal $y_t$ are used to calculate the spectral efficiency. In one implementation, the spectral efficiency is a positive value that occurs a set number of times for each time slot, which can be one second. In one implementation, the spectral efficiency samples are provided to the predictor process and the output of the predictor process is the spectral efficiency samples plus a difference value, delta, which may be used to find the RTBS.

The Wold decomposition is expressed by the following, with MA standing for moving average:

$$y_t = MA(\infty) + \text{Predictable Process}$$

$$y_t = \sum_{j=0}^{\infty} d_j e_{t-j} + \eta_t$$

wherein:

$$e_t = y_t - \hat{E}\{y_t | \underline{y}_{t-1}\} = y_t - \hat{y}_{t|t-1}$$

$$d_0 = 1, \Sigma_{j=0}^{\infty} d_j^2 < \infty, Ee_t^2 = \sigma_e^2, Ee_t e_s = 0 \text{ for } t \neq s,$$

$$Ee_t = 0, E\eta_t e_s = 0 \text{ for all } t,s$$

Where $y_t$ is the time series being considered, the signal, $e_{t-j}$ is an uncorrelated sequence, or error sequence, which is the innovation process to the process $y_t$—that is, a white noise process that is input to the linear filter $\{d_j\}$. $d_j$ is the possibly infinite vector of moving average weights (coefficients or parameters), and $\eta_t$ being a deterministic component, which is zero in the absence of trends in $y_t$. The symbol E is the matrix value of e, and $E\{x\}$ is the expected value of x.

Then, the Wold decomposition of the single $y_k$ is approximated with a finite-dimensional ARMA model:

$$y_k - a_1 y_{k-1} - \ldots - a_n y_{k-n} = e_k - d_1 e_{k-1} - \ldots - d_m e_{k-m} \quad (1)$$

where $e_k$ are approximate innovations of y and it is assumed that $E(e_k | \underline{Y}_{k-1}) = 0$ In the above, the first pole and the first zero are also approximated in order to obtain the prediction error, e. Then the optimal estimator equation—Equation (1) above—is propagated, which results in:

$$\hat{y}_k = \hat{y}_{k|k-1} = E(y_k | \underline{Y}_{k-1}) = a_1 y_{k-1} + \ldots + a_n y_{k-n} - d_1 e_{k-1} - \ldots - d_m e_{k-m}$$

where $e_k = y_k - \hat{y}_k =$ approximate innovations=Prediction Error (PE)

Then the UE derives the order optimal estimator equation:

$$\hat{y}_{k+1} = a\hat{y}_k + Le_k = [\hat{y}_k e_k][a \ L]^T$$

where $L_i = a_i - d_i$

Figure 4:
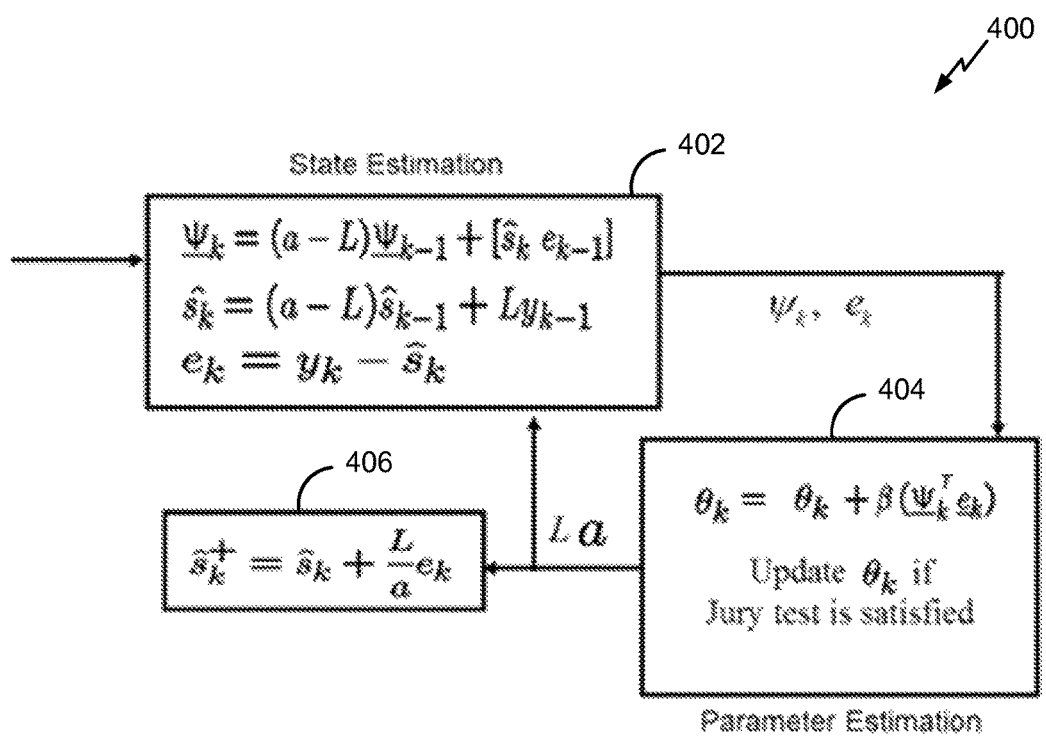
FIG. 4 illustrates a predictor architecture diagram used for GDRPEM, according to aspects of the present disclosure.

The next objective is to actually solve for the a and L values, once the order optimal estimator equation is obtained by the GDRPEM, as shown in FIG. 4.

FIG. 4 illustrates an overall predictor architecture 400, according to aspects of the present disclosure. The predictor architecture includes three subsystems: a state estimation block 402, a parameter estimation block 404 and a state corrector block 406. The state estimation block 402 predicts the signals. The parameter estimation block 404 estimates the required parameters of the models. The state corrector block 406 performs a final filtering of the predictor using the most recent sample.

The variables are defined as follows: $y_k$ represents the received sample at time k. $\hat{s}_k$ is a single stage predictor at time k, given samples up to and including time k−1. $e_k$ is the prediction error that will become an innovation sequence for the correct model, i.e., received samples being Gaussian. $\Psi_k$ determines the direction of search and is driven by previous prediction error and a current predictor. θ is a total parameter set and in this case, θ is made up of L and a. θ is admissible only if it passes a stability test. As described in FIG. 4, the jury test or jury method is used to institute stability and is considered a stability test. $\hat{s}_k^+$ is a filtered predicted estimate, also referred to as the Kalman corrector. β is the step size for a gradient search.

The predictor architecture is completed by using the dynamic of the state in order to predict delta (Δ) steps into the future, as described in the equations below.

$$\hat{s}_{k+1} = a\hat{s}_k + Le_k$$

$$\hat{s}_k^+ = \hat{s}_k + \frac{L}{a} e_k$$

$$\hat{s}_{k+\Delta|k} = a^\Delta \hat{s}_k^+$$

State estimation from the architecture 400 was used to turn the parametric model for e into an equation for "s" expressed as a Δ-step GDRPEM predictor equation, as derived above. Then, the Δ-step GDRPEM predictor equation is translated into a RTBS value that is to be returned to the base station.

As a summary of the CQI alignment process, $y_k$ is input into the predictor process and is output as $\hat{s}_{k+\Delta|k}$. The value of $\hat{s}_{k+\Delta|k}$ is the prediction that is a delta (Δ) step into the future for a particular implementation that may also reflect the predicted spectral efficiency. The $\hat{s}_{k+\Delta}$ will then be translated into the RTBS (recommended transport block size), which then is correlated to the rate or recommended rate of transfer for the base station. Also, as a result of the process, an RTBS is returned to the base station in order to determine a recommended rate for transmitting signals.

Figure 5A:
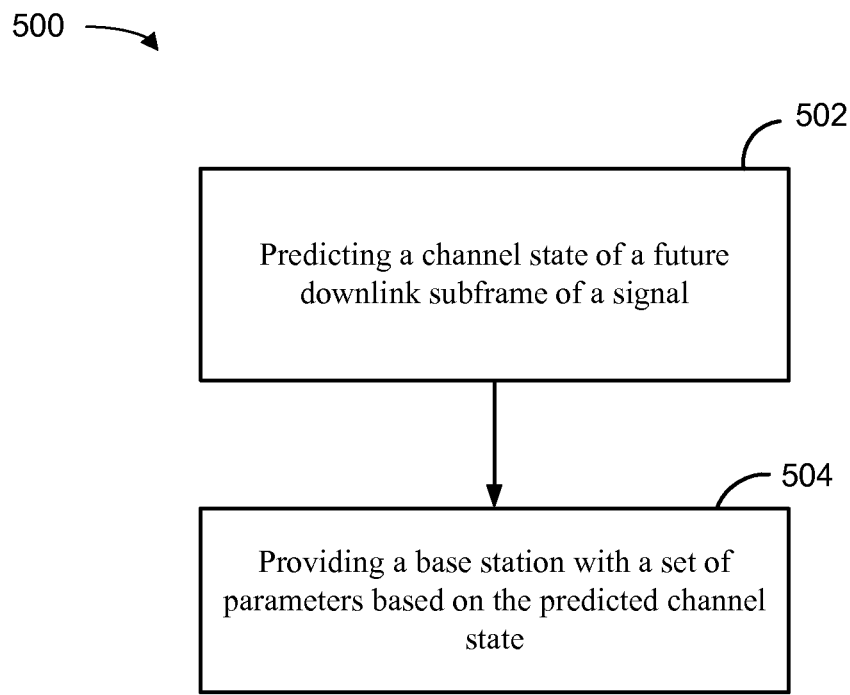
FIG. 5A is a block diagram illustrating a method for performing channel state prediction according to aspects of the present disclosure.

FIG. 5A shows a wireless communication method 500 according to one aspect of the disclosure. In block 502, a channel state of a future downlink subframe of a signal is predicted. In block 504, a base station is provided with a set of parameters based on the predicted channel state from block 502.

Figure 5B:
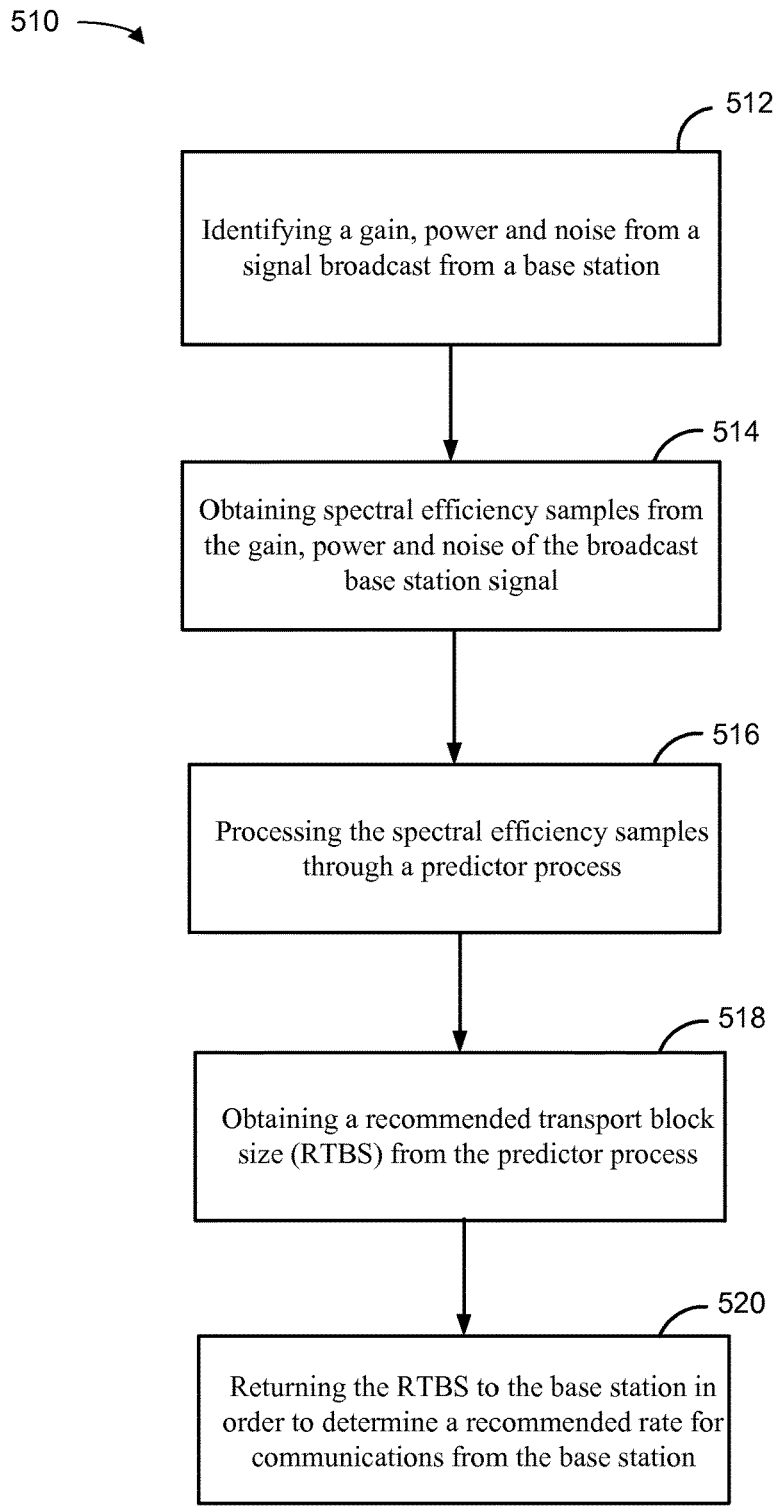
FIG. 5B is a block diagram illustrating a method for performing channel state prediction according to aspects of the present disclosure.

FIG. 5B shows a wireless communication method 510 according to one aspect of the disclosure. In block 512, a base station may perform the act of identifying a gain, power and noise from a signal from a base station. In block 514, spectral efficiency samples are obtained from the gain, power and noise of the base station signal. In block 516, the spectral efficiency samples are processed through a predictor process. In block 518, an RTBS is obtained from the predictor process. In block 520, the RTBS is returned to the base station in order to determine a recommended rate for communications from the base station.

Figure 6:
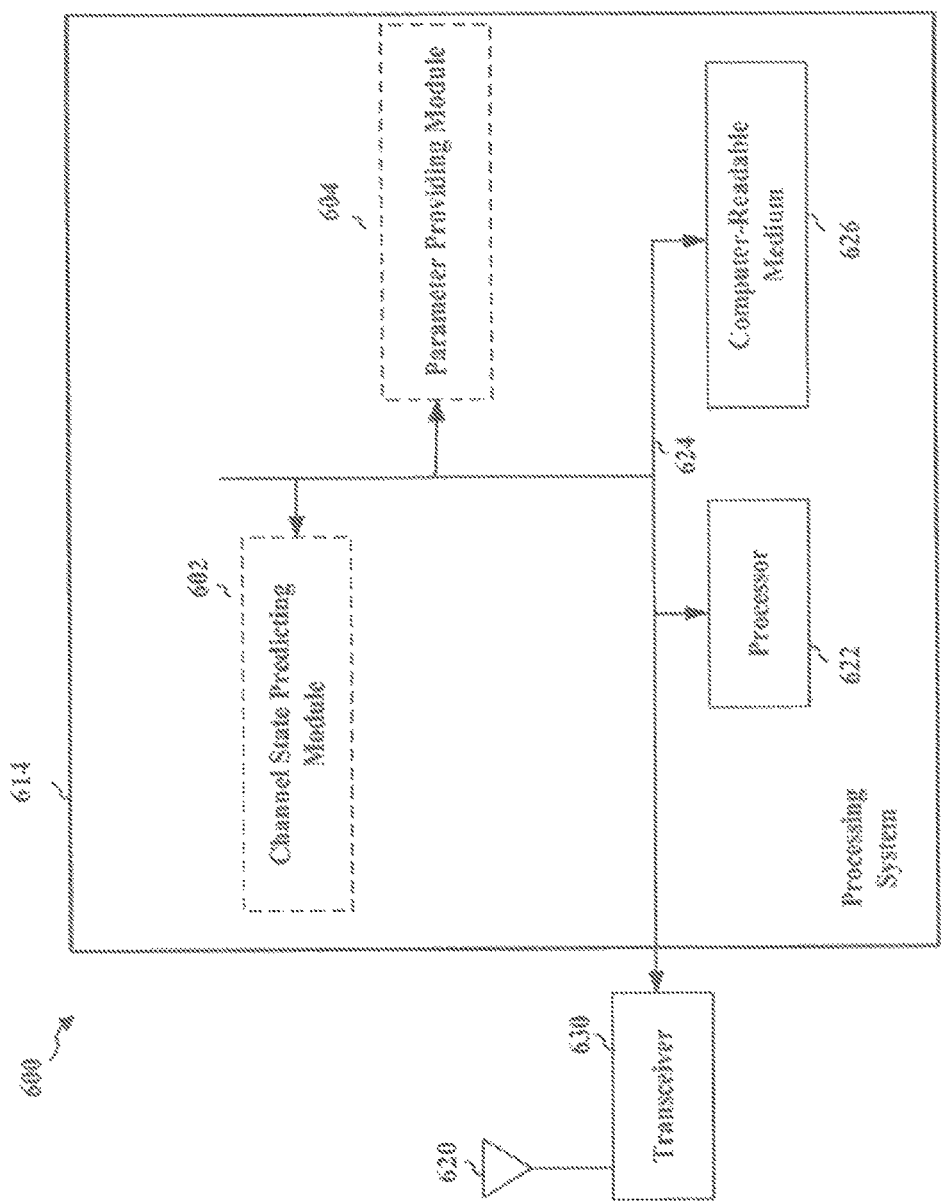
FIG. 6 is a diagram illustrating an example of a hardware implementation for an apparatus employing a processing system according to one aspect of the present disclosure.

FIG. 6 is a diagram illustrating an example of a hardware implementation for an apparatus 600 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 622, a channel state predicting module 602, a parameter providing module 604, and the computer-readable medium 626. The bus 624 may also link various other circuits such as timing sources, peripherals, voltage regulators, and power management circuits, which are well known in the art, and therefore, will not be described any further.

The apparatus includes a processing system 614 coupled to a transceiver 630. The transceiver 630 is coupled to one or more antennas 620. The transceiver 630 enables communicating with various other apparatus over a transmission medium. The processing system 614 includes a processor 622 coupled to a computer-readable medium 626. The processor 622 is responsible for general processing, including the execution of software stored on the computer-readable medium 626. The software, when executed by the processor 622, causes the processing system 614 to perform the various functions described for any particular apparatus. The computer-readable medium 626 may also be used for storing data that is manipulated by the processor 622 when executing software.

The processing system 614 includes a channel state predicting module 602 for predicting a channel state of a future downlink subframe of a signal. The processing system also includes a parameter providing module 604 for providing a base station with a set of parameters based on the predicted channel state. The modules may be software modules running in the processor 622, resident/stored in the computer-readable medium 626, one or more hardware modules coupled to the processor 622, or some combination thereof. The processing system 614 may be a component of UE 350 and may include the memory 392, and/or the controller/processor 390.

In one configuration, an apparatus such as a UE 350 is configured for wireless communication including means for predicting a channel state of a future downlink subframe of a signal. In one aspect, the means for predicting channel state may be the controller/processor 390, the memory 392, the channel state prediction module 391, the channel state predicting module 602, and/or the processing system 614 configured to perform the functions recited by the aforementioned means. In another aspect, the aforementioned means may be a module or any apparatus configured to perform the functions recited by the aforementioned means.

The apparatus also has means for providing a base station with a set of parameters based on the predicted channel state. In one aspect, the means for providing the base station with a set of parameters may be the antennas 352, the transmitter 356, the transmit frame processor 382, the transmit processor 380, the controller/processor 390, the memory 392, the parameter providing module 604, and/or the processing system 614 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, HSDPA, HSUPA, High Speed Packet Access Plus (HSPA+) and TD-CDMA. Various aspects may also be extended to systems employing LTE (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    predicting a channel state of a future downlink subframe of a signal by:
    identifying a gain, power and noise from the signal;
    obtaining spectral efficiency samples from the gain, power and noise of the signal;
    processing the spectral efficiency samples through a predictor process;
    obtaining a difference value for the future downlink subframe via the predictor process;
    providing a base station with a set of parameters based on the predicted channel state, in which the providing the base station comprises:
        obtaining a recommended transport block size (RTBS) from the predictor process based at least in part on the difference value; and
        returning the RTBS to the base station as one of the set of parameters; and
    receiving a communication from the base station based at least in part on the returned RTBS.

2. The method of claim 1, in which processing the spectral efficiency samples through the predictor process comprises:
    modeling the spectral efficiency samples as an auto regressive moving average (ARMA);
    using a first order approximation to a Wold decomposition to obtain a prediction error, e;
    defining a parametric model for e having variables a, a modeled pole, and L, a filtered pole;
    solving for a and L using a cost function of $|e|2$;

using state estimation to derive a D-step gradient descent recursive prediction error method (GDRPEM) equation; and translating the derived D-step GDRPEM equation into a RTBS value that is to be returned to the base station.

3. The method of claim 2, in which the first order approximation is based at least in part on a Kalman filter.

4. The method of claim 1, in which the wireless communication occurs in a Time Division-Synchronous Code Division Multiple Access (TD-SCDMA) network.

5. An apparatus for wireless communication, comprising:
a memory; and
at least one processor coupled to the memory, the at least one processor being configured:
to predict a channel state of a future downlink subframe of a signal by identifying a gain, power and noise from the signal;
obtaining spectral efficiency samples from the gain, power and noise of the signal;
processing the spectral efficiency samples through a predictor process;
obtaining a difference value for the future downlink subframe via the predictor process;
to provide a base station with a set of parameters based on the predicted channel state, in which the at least one processor is configured to provide by:
obtaining a recommended transport block size (RTBS) from the predictor process based at least in part on the difference value; and
returning the RTBS to the base station as one of the set of parameters; and
receiving a communication from the base station based at least in part on the returned RTBS.

6. The apparatus of claim 5, in which the at least one processor configured to process the spectral efficiency samples through the predictor process is further configured:
to model the spectral efficiency samples as an auto regressive moving average (ARMA);
to use a first order approximation to a Wold decomposition to obtain a prediction error, e;
to define a parametric model for e having variables a, a modeled pole, and L, a filtered pole;
to solve for a and L using a cost function of $|e|2$;
to use state estimation to derive a D-step gradient descent recursive prediction error method (GDRPEM) equation; and
to translate the derived D-step GDRPEM equation into a RTBS value that is to be returned to the base station.

7. The apparatus of claim 6, in which the first order approximation is based at least in part on a Kalman filter.

8. The apparatus of claim 5, in which the wireless communication occurs in a Time Division-Synchronous Code Division Multiple Access (TDSCDMA) network.

9. An apparatus for wireless communication, comprising:
means for predicting a channel state of a future downlink subframe of a signal comprising:
means for identifying a gain, power and noise from the signal;
means for obtaining spectral efficiency samples from the gain, power and noise of the signal;
means for processing the spectral efficiency samples through a predictor process;
means for obtaining a difference value for the future downlink subframe via the predictor process;
means for providing a base station with a set of parameters based on the predicted channel state, in which the means for providing the base station with the set of parameters based on the predicted channel state comprises:
means for obtaining a recommended transport block size (RTBS) from the predictor process based at least in part on the difference value; and
means for returning the RTBS to the base station as one of the set of parameters; and
means for receiving a communication from the base station based at least in part on the returned RTBS.

10. The apparatus of claim 9, in which the means for processing the spectral efficiency samples through the predictor process comprises:
means for modeling the spectral efficiency samples as an auto regressive moving average (ARMA);
means for using a first order approximation to a Wold decomposition to obtain a prediction error, e;
means for defining a parametric model for e having variables a, a modeled pole, and L, a filtered pole;
means for solving for a and L using a cost function of $|e|2$;
means for using state estimation to derive a D-step gradient descent recursive prediction error method (GDRPEM) equation; and
means for translating the derived D-step GDRPEM equation into a RTBS value that is to be returned to the base station.

11. The apparatus of claim 10, in which the first order approximation is based at least in part on a Kalman filter.

12. The apparatus of claim 9, in which the wireless communication occurs in a Time Division-Synchronous Code Division Multiple Access (TD-SCDMA) network.

13. A computer program product for wireless communication in a wireless network, comprising:
a non-transitory computer-readable medium having non-transitory program code recorded thereon, the program code comprising:
program code to predict a channel state of a future downlink subframe of a signal by:
identifying a gain, power and noise from the signal;
obtaining spectral efficiency samples from the gain, power and noise of the signal;
processing the spectral efficiency samples through a predictor process; and
obtaining a difference value for the future downlink subframe via the predictor process;
program code to provide a base station with a set of parameters based on the predicted channel state, in which the program code to provide the base station with the set of parameters based on the predicted channel state comprises:
program code to obtain a recommended transport block size (RTBS) from the predictor process based at least in part on the difference value; and
program code to return the RTBS to the base station as one of the set of parameters; and
program code to receive a transmission from the base station based at least in part on the RTBS.

14. The computer program product of claim 13, in which the program code to process the spectral efficiency samples through the predictor process comprises:
program code to model the spectral efficiency samples as an auto regressive moving average (ARMA);
program code to use a first order approximation to a Wold decomposition to obtain a prediction error, e;
program code to define a parametric model for e having variables a, a modeled pole, and L, a filtered pole;

program code to solve for a and L using a cost function of $|e|2$;

program code to use state estimation to derive a D-step gradient descent recursive prediction error method (GDRPEM) equation; and program code to translate the derived D-step GDRPEM equation into a RTBS value that is to be returned to the base station.

15. The computer program product of claim 14, in which the first order approximation is based at least in part on a Kalman filter.

16. The computer program product of claim 13, in which the wireless communication occurs in a Time Division-Synchronous Code Division Multiple Access (TDSCDMA) network.

* * * * *